UNITED STATES PATENT OFFICE.

ALBERT WOLFF, OF COLOGNE, GERMANY.

PROCESS FOR THE PREPARATION OF FORMATES OF CHROMIUM, ALUMINIUM, AND IRON.

1,054,735. Specification of Letters Patent. Patented Mar. 4, 1913.

No Drawing. Application filed October 24, 1911. Serial No. 656,386.

*To all whom it may concern:*

Be it known that I, ALBERT WOLFF, a subject of the Emperor of Germany, and residing at Cologne-on-the-Rhine, in the Kingdom of Prussia and Empire of Germany, have invented certain new and useful Improvements in Processes for the Preparation of Formates of Chromium, Aluminium, and Iron, of which the following is a specification.

My invention consists in preparing formates of those metals, of which the sulfates, when in the form of highly concentrated solutions admixed and agitated with solid sodium formate, cause sodium sulfate to precipitate out in crystalline form, while the formates of the metals themselves remain in solution. The substances best adapted for the purpose of the invention are chromium formate, aluminium formate and ferric formate.

I have found, that by stirring solid sodium formate with highly concentrated solutions of chromium sulfate or aluminium sulfate or ferric sulfate a double decomposition takes place, whereby sodium sulfate is precipitated in a crystalline form whereas chromium formate or aluminium formate or ferric formate remain in solution. The reaction takes place for example according to the following equation:

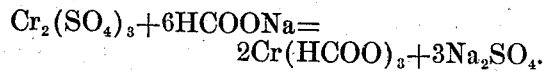

The sodium sulfate is precipitated out nearly quantitatively. It could not be supposed that the decomposition would take place in the manner stated, because in the present instance from two substances that are easily soluble in water two other substances are obtained which are also easily soluble in water, whereas under usual circumstances a double decomposition of salts only takes place if one or the other of the salts produced is insoluble or slightly soluble. The fact of the reaction taking place without the formation of basic compounds is all the more surprising because if sodium acetate is substituted for the formate not only sodium sulfate is precipitated but also basic aluminium acetate or other basic acetates which are slightly soluble.

Example I: 350 gr. of solid and powdered sodium formate are stirred with 1000 gr. of a solution of chromium sulfate containing 13% of chromium oxid. The mixture is allowed to stand for 24 hours in the cold and is afterward freed from the crystalline precipitate in a centrifugal machine or by other well known means. In this manner a solution is obtained of about 1.37 spec. grav. containing as a rule 54% of chromium formate. The solution contains no more than 1 to 2% of sodium sulfate.

Example II: 408 gr. of solid and powdered sodium formate are stirred with a solution of 670 gr. of aluminium sulfate ($18H_2O$) dissolved in 800 gr. of water. The mixture is allowed to stand for about 24 hours at 0° C. and stirred from time to time. Sodium sulfate is precipitated and the solution of aluminium formate is freed from the crystalline mass in a centrifugal machine. The solution obtained has a specific gravity of 1.27 and contains about 40% of aluminium formate and only from 2 to 3% of sodium sulfate.

When using ferric sulfate in place of chromium sulfate or aluminium sulfate, solutions of ferric formate are formed in which, however, larger quantities of sodium sulfate are present. The solutions of chromium formate and aluminium formate obtained by that process can be boiled down under a reduced pressure of 20 mm. and at a temperature below 40° C., in order to obtain the formates of chromium and aluminium in a solid state. It is preferable not to use pure sodium formate but rather the technical formate, which contains some sodium carbonate and sodium hydrate because otherwise basic solutions of chromium formate and aluminium formate are formed and are apt to separate out on standing.

The composition of the solid chromium formate approximately corresponds with the formula

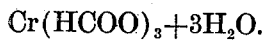

It forms either a green powder or violet scales. The latter modification is formed when the solution is boiled down at a temperature below 35° C. Both modifications are easily soluble in water. The aqueous solution of the green modification is gradually converted into the violet modification on standing.

The solid aluminium formate approximately corresponds with the formula $$Al(HCOO)_3 + 3H_2O.$$

It forms colorless scales that are easily soluble in water.

The formates of chromium, aluminium and iron are specially suitable as mordants for dyeing textile fabrics. For that purpose it is not always required to separate the sodium sulfate from the formate. The product of reaction obtained by stirring solid sodium formate with solutions of chromium sulfate or aluminium sulfate or ferric sulfate can be directly used as mordants after diluting with water.

Example III: 42 parts of solid and powdered sodium formate are stirred with 100 parts of an aqueous solution of chromium sulfate containing 15% of chromium oxid. When mixing the mass the temperature has a tendency to rise. After it has cooled down to the usual temperature it is diluted with water to the concentration required.

Example IV: 28 parts of solid and powdered sodium formate are stirred with 100 parts of a solution of basic chromium ⅔ sulfate containing 15% of chromium oxid. After cooling the mass is diluted.

Example V: 408 parts of solid and powdered sodium formate are stirred with 100 parts of a solution of ferric sulfate containing 40% of ferric sulfate. After cooling the mass is diluted, as required.

What I claim is:—

1. A process of preparing formates of metals, which consists in admixing and agitating solid sodium formate with a highly concentrated solution of the sulfate of a metal which will cause sodium sulfate to precipitate out in crystalline form while the formate of the metal itself remains in solution, allowing the mixture to stand until sodium sulfate has crystallized out, and thereafter removing the sodium sulfate.

2. A process of preparing formates of metals, which consists in admixing and agitating solid sodium formate with a highly concentrated solution of the sulfate of a metal which will cause sodium sulfate to precipitate out in crystalline form while the formate of the metal itself remains in solution, separating the sodium sulfate, and concentrating the solution at a reduced pressure and at a temperature below 40° C., whereby the formate of the metal is obtained in solid form.

In testimony whereof I affix my signature in presence of two witnesses.

ALBERT WOLFF.

Witnesses:
HENRY HASPER,
WOLDEMAR HAUPT.